US007804958B2

(12) United States Patent
Kahn et al.

(10) Patent No.: US 7,804,958 B2
(45) Date of Patent: *Sep. 28, 2010

(54) SUPER ENCRYPTED STORAGE AND RETRIEVAL OF MEDIA PROGRAMS WITH SMARTCARD GENERATED KEYS

(75) Inventors: Raynold M. Kahn, Los Angeles, CA (US); Gregory J. Gagnon, Torrance, CA (US); David D. Ha, San Gabriel, CA (US); Peter M. Klauss, Torrance, CA (US); Christopher P. Curren, Brentwood, CA (US); Thomas H. James, Pacific Palisades, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/184,957

(22) Filed: Aug. 1, 2008

(65) Prior Publication Data

US 2008/0313474 A1 Dec. 18, 2008

Related U.S. Application Data

(63) Continuation of application No. 09/620,772, filed on Jul. 21, 2000, now Pat. No. 7,457,414.

(51) Int. Cl.
*H04N 7/167* (2006.01)
(52) U.S. Cl. .................................. 380/201
(58) Field of Classification Search .............. 380/201; 725/2, 6
See application file for complete search history.

(56) References Cited

U.S. PATENT DOCUMENTS 4,613,901 A 9/1986 Gilhousen et al.

FOREIGN PATENT DOCUMENTS

EA 0002703 8/2002

(Continued)

OTHER PUBLICATIONS

Japanese Office Action dated Feb. 17, 2009 in Japanese Patent Application No. 2001-222227 filed Jul. 23, 2001 by Raynold M. Kahn et al.

(Continued)

*Primary Examiner*—Ellen Tran (57) ABSTRACT

A method and apparatus for storing and retrieving program material for subsequent replay is disclosed. In summary, the present invention describes a system and method for storing and retrieving program material for subsequent replay. The method comprises the steps of accepting encrypted access control information and the program material encrypted according to a first encryption key, the access control information including a first encryption key and control data; decrypting the received access control information to produce the first encryption key; decrypting the program material using the first encryption key; re-encrypting the program material using according to a second encryption key; encrypting the second encryption key according to a third encryption key to produce a fourth encryption key; and providing the re-encrypted program material and a fourth encryption key for storage. The apparatus comprises a conditional access module, for accepting encrypted access control information and the program material encrypted according to a first encryption key, the encrypted access control information including the first encryption key and temporally-variant control data, the control access module comprising a first decryption module, for decrypting the access control information to produce the first encryption key; a first encryption module, for encrypting a second encryption key with a third encryption key to produce a fourth encryption key; and a second decryption module for decrypting the fourth encryption key to produce the second encryption key.

16 Claims, 5 Drawing Sheets

U.S. PATENT DOCUMENTS

| | | | |
|---|---|---|---|
| 4,633,309 A | 12/1986 | Li et al. | |
| 4,675,732 A | 6/1987 | Oleson | |
| 4,694,490 A | 9/1987 | Harvey et al. | |
| 4,866,769 A | 9/1989 | Karp | |
| 4,866,787 A | 9/1989 | Olesen | |
| 4,941,176 A | 7/1990 | Matyas et al. | |
| 5,029,207 A | 7/1991 | Gammie | |
| 5,033,084 A | 7/1991 | Beecher | |
| 5,068,894 A | 11/1991 | Hoppe | |
| 5,132,992 A | 7/1992 | Yurt et al. | |
| 5,168,353 A | 12/1992 | Walker et al. | |
| 5,172,413 A | 12/1992 | Bradley et al. | |
| 5,199,066 A | 3/1993 | Logan | |
| 5,301,245 A | 4/1994 | Endoh | |
| 5,301,352 A | 4/1994 | Nakagawa et al. | |
| 5,335,277 A | 8/1994 | Harvey et al. | |
| 5,341,425 A | 8/1994 | Wasilewski | |
| 5,357,276 A | 10/1994 | Banker et al. | |
| 5,371,551 A | 12/1994 | Logan et al. | |
| 5,386,587 A | 1/1995 | Yuzawa | |
| 5,396,293 A | 3/1995 | Shellard | |
| 5,421,031 A | 5/1995 | De Bey | |
| 5,438,423 A | 8/1995 | Lynch et al. | |
| 5,440,336 A | 8/1995 | Buhro et al. | |
| 5,481,609 A | 1/1996 | Cohen et al. | |
| 5,495,531 A | 2/1996 | Smiedt | |
| 5,506,902 A | 4/1996 | Kubota | |
| 5,557,541 A | 9/1996 | Schulhof et al. | |
| 5,565,805 A | 10/1996 | Nakagawa et al. | |
| 5,583,937 A | 12/1996 | Ullrich et al. | |
| 5,586,264 A | 12/1996 | Belknap et al. | |
| 5,590,200 A | 12/1996 | Nachman et al. | |
| 5,592,551 A | 1/1997 | Lett et al. | |
| 5,592,651 A | 1/1997 | Rackman | |
| 5,594,491 A | 1/1997 | Hodge et al. | |
| 5,619,247 A | 4/1997 | Russo | |
| 5,640,453 A | 6/1997 | Schuchman et al. | |
| 5,642,418 A | 6/1997 | Farris et al. | |
| 5,663,896 A | 9/1997 | Aucsmith | |
| 5,675,390 A | 10/1997 | Schindler et al. | |
| 5,677,895 A | 10/1997 | Mankovitz | |
| 5,677,953 A | 10/1997 | Dolphin | |
| 5,701,383 A | 12/1997 | Russo et al. | |
| 5,701,582 A | 12/1997 | De Bey | |
| 5,710,970 A | 1/1998 | Walters et al. | |
| 5,715,315 A | 2/1998 | Handelman | |
| 5,715,403 A | 2/1998 | Stefik | |
| 5,721,829 A | 2/1998 | Dunn et al. | |
| 5,724,646 A | 3/1998 | Ganek et al. | |
| 5,729,280 A | 3/1998 | Inoue et al. | |
| 5,734,853 A | 3/1998 | Hendricks et al. | |
| 5,748,732 A | 5/1998 | Le Berre et al. | |
| 5,761,302 A | 6/1998 | Park | |
| 5,764,762 A | 6/1998 | Kazmierczak et al. | |
| 5,784,095 A | 7/1998 | Robbins et al. | |
| 5,790,663 A | 8/1998 | Lee et al. | |
| 5,790,783 A | 8/1998 | Lee et al. | |
| 5,793,971 A | 8/1998 | Fujita et al. | |
| 5,805,699 A | 9/1998 | Akiyama et al. | |
| 5,826,165 A | 10/1998 | Echeita et al. | |
| 5,831,664 A | 11/1998 | Wharton et al. | |
| 5,845,240 A | 12/1998 | Fielder | |
| 5,848,158 A | 12/1998 | Saito et al. | |
| 5,850,218 A | 12/1998 | LaJoie et al. | |
| 5,864,747 A | 1/1999 | Clark et al. | |
| 5,867,207 A | 2/1999 | Chaney et al. | |
| 5,867,579 A | 2/1999 | Saito | |
| 5,899,582 A | 5/1999 | DuLac | |
| 5,912,969 A | 6/1999 | Sasamoto et al. | |
| 5,914,941 A | 6/1999 | Janky | |
| 5,926,205 A | 7/1999 | Krause et al. | |
| 5,930,215 A | 7/1999 | Fite et al. | |
| 5,933,500 A | 8/1999 | Blatter et al. | |
| 5,936,660 A | 8/1999 | Gurantz | |
| 5,937,067 A | 8/1999 | Thatcher et al. | |
| 5,953,418 A | 9/1999 | Bock et al. | |
| 5,966,186 A | 10/1999 | Shigihara et al. | |
| 5,973,756 A | 10/1999 | Erlin | |
| 5,978,649 A | 11/1999 | Kahn et al. | |
| 5,999,628 A | 12/1999 | Chan | |
| 5,999,629 A | 12/1999 | Heer et al. | |
| 6,005,937 A | 12/1999 | Lee | |
| 6,011,511 A | 1/2000 | Chuong et al. | |
| 6,025,868 A | 2/2000 | Russo | |
| 6,055,314 A * | 4/2000 | Spies et al. | 380/228 |
| 6,055,566 A | 4/2000 | Kikinis | |
| 6,061,451 A | 5/2000 | Muratani et al. | |
| 6,061,452 A | 5/2000 | Suzuki | |
| 6,069,647 A | 5/2000 | Sullivan et al. | |
| 6,072,873 A | 6/2000 | Bewick | |
| 6,072,982 A | 6/2000 | Haddad | |
| 6,075,330 A | 6/2000 | Terk | |
| 6,091,883 A | 7/2000 | Artigalas et al. | |
| 6,097,441 A | 8/2000 | Allport | |
| 6,105,134 A | 8/2000 | Pinder et al. | |
| 6,144,400 A | 11/2000 | Ebisawa | |
| 6,148,081 A | 11/2000 | Szymanski et al. | |
| 6,154,206 A | 11/2000 | Ludtke | |
| 6,157,719 A | 12/2000 | Wasilewski et al. | |
| 6,157,949 A | 12/2000 | Cheng et al. | |
| 6,163,284 A | 12/2000 | Munakata | |
| 6,169,879 B1 | 1/2001 | Perlman | |
| 6,178,242 B1 | 1/2001 | Tsuria | |
| 6,202,211 B1 | 3/2001 | Williams, Jr. | |
| 6,226,618 B1 | 5/2001 | Downs et al. | |
| 6,229,895 B1 | 5/2001 | Son et al. | |
| 6,240,401 B1 | 5/2001 | Oren et al. | |
| 6,263,504 B1 | 7/2001 | Ebisawa | |
| 6,266,481 B1 | 7/2001 | Lee et al. | |
| 6,286,142 B1 | 9/2001 | Ehreth | |
| 6,288,716 B1 | 9/2001 | Humpleman et al. | |
| 6,289,455 B1 | 9/2001 | Kocher et al. | |
| 6,317,883 B2 | 11/2001 | Marics | |
| 6,317,884 B1 | 11/2001 | Eames et al. | |
| 6,370,688 B1 | 4/2002 | Hejna, Jr. | |
| 6,381,747 B1 | 4/2002 | Wonfor et al. | |
| 6,398,245 B1 | 6/2002 | Gruse et al. | |
| 6,405,372 B1 | 6/2002 | Kim et al. | |
| 6,415,031 B1 | 7/2002 | Colligan et al. | |
| 6,418,421 B1 | 7/2002 | Hurtado et al. | |
| 6,437,836 B1 | 8/2002 | Huang et al. | |
| 6,456,985 B1 | 9/2002 | Ohtsuka | |
| 6,466,671 B1 | 10/2002 | Maillard et al. | |
| 6,466,921 B1 | 10/2002 | Cordery et al. | |
| 6,473,858 B1 | 10/2002 | Shimomura et al. | |
| 6,476,825 B1 | 11/2002 | Croy et al. | |
| 6,480,667 B1 | 11/2002 | O'Connor | |
| 6,487,663 B1 | 11/2002 | Jaisimha et al. | |
| 6,487,722 B1 | 11/2002 | Okura et al. | |
| 6,496,980 B1 | 12/2002 | Tillman et al. | |
| 6,502,139 B1 | 12/2002 | Birk et al. | |
| 6,510,519 B2 | 1/2003 | Wasilewski et al. | |
| 6,516,465 B1 | 2/2003 | Paskins | |
| 6,519,693 B1 | 2/2003 | De Bey | |
| 6,519,772 B1 | 2/2003 | Bopardikar | |
| 6,530,085 B1 | 3/2003 | Perlman | |
| 6,542,870 B1 | 4/2003 | Matsumoto | |
| 6,550,011 B1 | 4/2003 | Sims, III | |
| 6,560,340 B1 | 5/2003 | Akins et al. | |
| 6,574,609 B1 | 6/2003 | Downs et al. | |
| 6,588,017 B1 | 7/2003 | Calderone | |
| 6,611,812 B2 | 8/2003 | Hurtado et al. | |
| 6,637,027 B1 | 10/2003 | Breslauer et al. | |
| 6,654,547 B1 | 11/2003 | Maeda et al. | |

| | | |
|---|---|---|
| 6,655,580 B1 | 12/2003 | Ergo et al. |
| 6,681,326 B2 | 1/2004 | Son et al. |
| 6,687,683 B1 | 2/2004 | Harada et al. |
| 6,697,489 B1 | 2/2004 | Candelore |
| 6,714,650 B1 | 3/2004 | Maillard et al. |
| 6,741,834 B1 | 5/2004 | Godwin |
| 6,745,245 B1 | 6/2004 | Carpenter |
| 6,748,080 B2 | 6/2004 | Russ et al. |
| 6,754,827 B1 | 6/2004 | Cane et al. |
| 6,754,904 B1 | 6/2004 | Cooper et al. |
| 6,766,451 B1 | 7/2004 | Van Rijnsoever |
| 6,772,133 B1 | 8/2004 | Kambayashi et al. |
| 6,772,434 B1 | 8/2004 | Godwin |
| 6,804,357 B1 | 10/2004 | Ikonen et al. |
| 6,834,111 B1 | 12/2004 | Nishimura et al. |
| 6,853,728 B1 | 2/2005 | Kahn et al. |
| 6,862,582 B2 | 3/2005 | Harada et al. |
| 6,889,208 B1 | 5/2005 | Okabe et al. |
| 6,904,522 B1 | 6/2005 | Benardeau et al. |
| 6,912,513 B1 | 6/2005 | Candelore |
| 6,934,963 B1 | 8/2005 | Reynolds et al. |
| 6,961,858 B2 | 11/2005 | Fransdonk |
| 6,985,591 B2 | 1/2006 | Graunke |
| 6,993,499 B2 | 1/2006 | Gagnon et al. |
| 7,007,170 B2 | 2/2006 | Morten |
| 7,035,827 B2 | 4/2006 | Ezaki |
| 7,036,011 B2 | 4/2006 | Grimes et al. |
| 7,093,295 B1 | 8/2006 | Saito |
| 7,099,946 B2 | 8/2006 | Lennon et al. |
| 7,177,911 B2 | 2/2007 | deCarmo |
| 7,191,335 B1 | 3/2007 | Maillard |
| 7,228,439 B2 | 6/2007 | Sasselli |
| 7,277,928 B2 | 10/2007 | Lennon |
| 7,298,849 B2 | 11/2007 | Graunke |
| 7,328,455 B2 | 2/2008 | Jutzi et al. |
| 7,403,618 B2 | 7/2008 | Van Rijnsoever et al. |
| 7,492,897 B1 * | 2/2009 | Eskicioglu et al. .......... 380/231 |
| 2001/0001876 A1 | 5/2001 | Morgan et al. |
| 2001/0046299 A1 | 11/2001 | Wasilewski et al. |
| 2001/0053979 A1 | 12/2001 | Kori |
| 2002/0001386 A1 | 1/2002 | Akiyama |
| 2002/0002674 A1 | 1/2002 | Grimes et al. |
| 2002/0021805 A1 | 2/2002 | Schumann et al. |
| 2002/0023219 A1 | 2/2002 | Treffers et al. |
| 2002/0048367 A1 | 4/2002 | Maillard |
| 2002/0056112 A1 | 5/2002 | Dureau et al. |
| 2002/0094084 A1 | 7/2002 | Wasilewski et al. |
| 2002/0101991 A1 | 8/2002 | Bacon et al. |
| 2002/0112243 A1 | 8/2002 | Hunter et al. |
| 2002/0116705 A1 | 8/2002 | Perlman et al. |
| 2002/0162104 A1 | 10/2002 | Raike et al. |
| 2002/0166121 A1 | 11/2002 | Rovira |
| 2002/0170054 A1 | 11/2002 | Kudelski et al. |
| 2002/0170072 A1 | 11/2002 | Lundbald et al. |
| 2002/0196374 A1 | 12/2002 | Barry et al. |
| 2003/0005285 A1 | 1/2003 | Graunke |
| 2003/0026428 A1 | 2/2003 | Loisel |
| 2003/0037006 A1 | 2/2003 | Maruyama et al. |
| 2003/0040962 A1 | 2/2003 | Lewis et al. |
| 2003/0061477 A1 | 3/2003 | Kahn et al. |
| 2003/0097622 A1 | 5/2003 | Liu et al. |
| 2003/0105718 A1 | 6/2003 | Hurtado et al. |
| 2003/0110132 A1 | 6/2003 | Sako |
| 2003/0131349 A1 | 7/2003 | Kuczynski-Brown |
| 2003/0131353 A1 | 7/2003 | Blom et al. |
| 2003/0145183 A1 | 7/2003 | Muehring et al. |
| 2003/0174844 A1 | 9/2003 | Candelore |
| 2003/0188164 A1 | 10/2003 | Okimoto |
| 2003/0196113 A1 | 10/2003 | Brown et al. |
| 2003/0208771 A1 | 11/2003 | Hensgen et al. |
| 2003/0228911 A1 | 12/2003 | Dernis et al. |
| 2004/0032950 A1 | 2/2004 | Graunke |
| 2004/0068747 A1 | 4/2004 | Robertson et al. |
| 2004/0073954 A1 | 4/2004 | Bjordammen et al. |
| 2004/0148634 A1 | 7/2004 | Arsenault et al. |
| 2004/0190721 A1 | 9/2004 | Barrett et al. |
| 2005/0039025 A1 | 2/2005 | Main et al. |
| 2005/0050333 A1 | 3/2005 | Yeap et al. |
| 2005/0071280 A1 | 3/2005 | Irwin et al. |
| 2005/0091681 A1 | 4/2005 | Borden et al. |
| 2005/0108519 A1 | 5/2005 | Barton et al. |
| 2005/0144248 A1 | 6/2005 | Doganowski et al. |
| 2005/0144468 A1 | 6/2005 | Northcutt et al. |
| 2005/0169468 A1 | 8/2005 | Fahrny et al. |
| 2005/0182931 A1 | 8/2005 | Robert et al. |
| 2005/0183112 A1 | 8/2005 | Duval |
| 2005/0235361 A1 | 10/2005 | Alkove et al. |
| 2005/0249350 A1 | 11/2005 | Kahn et al. |
| 2006/0031873 A1 | 2/2006 | Fahrny et al. |
| 2006/0039565 A1 | 2/2006 | Kim et al. |
| 2006/0168663 A1 | 7/2006 | Viljoen et al. |
| 2006/0179489 A1 | 8/2006 | Mas Ribes |
| 2007/0092077 A1 | 4/2007 | Yoshida et al. |
| 2007/0092078 A1 | 4/2007 | Yoshida et al. |

FOREIGN PATENT DOCUMENTS

| | | |
|---|---|---|
| EP | 0677949 | 10/1995 |
| EP | 0710017 | 5/1996 |
| EP | 0912052 | 4/1999 |
| EP | 0936812 | 8/1999 |
| EP | 0975165 | 1/2000 |
| EP | 0989557 | 3/2000 |
| EP | 1122910 | 8/2001 |
| EP | 1156676 | 11/2001 |
| EP | 1304871 | 4/2003 |
| EP | 1369152 | 12/2003 |
| EP | 1418701 | 5/2004 |
| GB | 2272822 | 5/1994 |
| GB | 2354392 | 3/2001 |
| JP | 5-284499 | 10/1993 |
| JP | 06351023 | 12/1994 |
| JP | 08125651 A | 5/1996 |
| JP | 8287014 | 11/1996 |
| JP | 10-013784 | 1/1998 |
| JP | 11136708 | 5/1999 |
| JP | 11232776 | 8/1999 |
| JP | 2000-122539 | 4/2000 |
| JP | 2000122933 A | 4/2000 |
| WO | WO 92/11713 | 7/1992 |
| WO | 9907150 A1 | 2/1999 |
| WO | 9909743 | 2/1999 |
| WO | WO 99/18729 | 4/1999 |
| WO | WO 00/08909 | 2/2000 |
| WO | WO 00/13412 | 3/2000 |
| WO | WO 00/14967 | 3/2000 |
| WO | WO 00/19294 | 4/2000 |
| WO | WO 01/22724 | 3/2001 |
| WO | WO 01/37546 | 5/2001 |
| WO | WO 01/43444 | 6/2001 |
| WO | WO 01/65762 | 9/2001 |
| WO | 01/98903 A1 | 12/2001 |
| WO | WO 01/99422 | 12/2001 |
| WO | WO 02/15184 | 2/2002 |
| WO | WO 02/065750 | 8/2002 |
| WO | 2004/014075 A2 | 2/2004 |
| WO | WO 2004/017637 | 2/2004 |
| WO | WO 2004/057871 | 7/2004 |
| WO | WO 2004/082286 | 9/2004 |

OTHER PUBLICATIONS

Non-final Office Action dated Apr. 23, 2009 in U.S. Appl. No. 09/620,833, filed Jul. 21, 2000 by Raynold M. Kahn et al.
Notice of Allowance dated Sep. 12, 2008 in U.S. Appl. No. 11/701,800, filed Feb. 2, 2007 by Raynold Kahn et al.

Japanese Office Action dated Nov. 11, 2008 in Japanese Patent Application No. 2001-222222 filed Jul. 23, 2001 by Raynold M. Kahn et al.
Summons to attend Oral Proceedings dated Sep. 24, 2008 in European patent Application No. 01117554.4 filed Jul. 20, 2001 by Raynold M. Kahn et al.
Non-final Office action dated Aug. 20, 2009 in U.S. Appl. No. 11/654,752, filed Jan. 18, 2007 by Raynold M. Kahn et al.
"PKCS #1 v2.1: RSA Cryptography Standard"; Jun. 14, 2002; RSA Laboratories; 61 pages.
"Introduction to Encryption Theory"; published by Kyoritsu Shuppan Co., Feb. 25, 1993.
Ma, Huadong; Shin, Kang G.; "Multicast Video on Demand Services"; ACM SIGCOMM Computer Communications Review; vol. 32, Issue 1; Jan. 2002; pp. 31-43; ACM Press; New York, New York.
Tantaoui et al.; "Interaction with Broadcast Video"; International Multimedia Conference Proceedings of the $10^{th}$ ACM International Conference on Multimedia; pp. 29-38; ACM Press; New York, New York; 2002; ISBN: 1-58113-620-X.
Carsten et al.; "Protecting VoD the Easier Way"; International Multimedia Conference Proceedings of the $6^{th}$ ACM International Conference on Multimedia; pp. 21-28; ACM Press; New York, New York; 2002; ISBN: 0-201-30990-4.
Japanese Office Action dated Jun. 17, 2008 in Japanese counterpart Application No. 2001-222222 corresponding to U.S. Appl. No. 09/621,476, filed Jul. 21, 2000 by Raynold M. Kahn et al., now issued Apr. 10, 2007 as US Patent No. 7,203,311.
Japanese Office Action dated Jun. 10, 2008 in Japanese counterpart Application No. 2005-04430 corresponding to U.S. Appl. No. 09/620,833, filed Jul. 21, 2000 by Raynold M. Kahn et al.
Non-final Office Action dated Mar. 17, 2008 in U.S. Appl. No. 10/701,800, filed Feb. 2, 2007 by Raynold M. Kahn et al.
Non-final Office Action dated Jan. 18, 2008 in U.S. Appl. No. 10/759,679, filed Jan. 19, 2004 by Arsenault et al.
Non-final Office Action dated Dec. 4, 2007 in U.S. Appl. No. 10/758,811, filed Jan. 16, 2004 by Kahn et al.
Notice of Allowance dated Dec. 5, 2007 in U.S. Appl. No. 09/620,833, filed Jul. 21, 2000 by Kahn et al.
Notice of Allowance dated Dec. 10, 2007 in U.S. Appl. No. 09/620,824, filed Sep. 21, 2001 by Kahn et al.
EPO Communication of Minutes of the Oral Proceedings dated Nov. 16, 2007 in European counterpart Application No. 01117555.1.
Tsubakyama, Hideki and Koga, Keiichiro; "Security for Information Data Broadcasting System with Conditional-Access Control"; IEEE; 1993; pp. 164-170.
EBU Project Group B/CA; "Functional Model of a Conditional Access System"; EBU Technical Review; Jun. 10, 1995; pp. 64-77.
Non-final Office Action dated Sep. 25, 2007 in U.S. Appl. No. 10/758,865, filed Jan. 16, 2004 by Raynold M. Kahn et al.
Final Rejection dated Aug. 20, 2007 in U.S. Appl. No. 10/758,818, filed Jan. 16, 2004 by Raynold M. Kahn et al.
Final Rejection dated Oct. 10, 2007 in U.S. Appl. No. 10/790,466, filed Mar. 1, 2004 by Stephen P. Dulac et al.
Hewlett Packard; "HP Jornada430/430se Palm-size PC: User's Guide"; 1999; pp. 7-9.
$1^{st}$ report of EBU/SMPTE Task Force for Harmonized Standards for the Exchange of Television Program Material as Bit Streams; May 6, 1997; Version 1.30; pp. 1-73.
Schneier, B.; "Applied Cryptography-Protocols, Algorithms, and Source Code in C"; $2^{nd}$ Edition; pp. 216-222, 357-362, 1996.
"PocketTV Brings Video to Palm-size PC"; Mar. 9, 2000; 2 pages.
Li, Yongchen et al.; "Security Enhanced MPEG Player"; IEEE; 1996; pp. 169-175.
Fink; Ready to take the dive? It's fast-forward as new DVD and Divx formats hit market (includes graphic: Home video: the next generation plus: Some selections that show off the system); York Daily Record; Dec. 21, 1998; pp. 1-3.
Lee, Sin-Joo et al.; "A Survey of Watermarking Techniques Applied to Multimedia"; IEEE; 2001; pp. 272-277.
"PocketTV-MPEG movie player for Pocket PC and WinCE"; May 17, 2000; MPEG TV, LLC; retrieved from URL: http://web.archive.org/web/20000062101238803/www.mpegtv.com/wince/pockettv/index.html.
"Download PockeTV (beta) for WinCE" Nov. 3, 1999; MPEG TV, LLC; retrieved from http://web.archive.org/web/19991127093158/www.mpegtv.com/wince/pockettv/index.html.
Anerousis, N.; "SkyCast: The Satellite Digital Broadcast Relay Service"; AT&T Labs Research; unpublished manuscript; 1999; pp. 1-4.
Non-final Office action dated Mar. 30, 2010 in U.S. Appl. No. 09/620,833, filed Jul. 21, 2000 by Raynold M. Kahn et al.
Non-final Office action dated Dec. 1, 2009 in U.S. Appl. No. 12/172,901, filed Jul. 14, 2008 by Raynold M. Kahn et al.
English translation of Appeal Decision of Rejection dated Oct. 13, 2009 in Japanese Patent Application No. 2001-222227 filed Jul. 23, 2001 by Raynold M. Kahn et al.; 16 pages.
Final Rejection dated Jun. 10, 2010 in U.S. Appl. No. 12/172,901 filed Jul. 14, 2008 by Raynold M. Kahn et al.

* cited by examiner

SUPER ENCRYPTED STORAGE AND RETRIEVAL OF MEDIA PROGRAMS WITH SMARTCARD GENERATED KEYS

CROSS-REFERENCE TO RELATED APPLICATIONS

This application is a continuation of application Ser. No. 09/620,772, entitled "SUPER ENCRYPTED STORAGE AND RETRIEVAL OF MEDIA PROGRAMS WITH SMARTCARD GENERATED KEYS", filed Jul. 21, 2000, by Raynold M. Kahn et al.;

This application is related to the following patent applications, all of which applications are hereby incorporated by reference herein:

U.S. patent application Ser. No. 09/620,833 entitled "SECURE STORAGE AND REPLAY OF MEDIA PROGRAMS USING A HARD-PAIRED RECEIVER AND STORAGE DEVICE," by Raynold M. Kahn, Gregory J. Gagnon, David D. Ha, Peter M. Klauss, Christopher P. Curren, and Thomas H. James, filed on Jul. 21, 2000;

U.S. patent application Ser. No. 09/621,476, entitled "SUPER ENCRYPTED STORAGE AND RETRIEVAL OF MEDIA PROGRAMS IN A HARD-PAIRED RECEIVER AND STORAGE DEVICE," by Raynold M. Kahn, Gregory J. Gagnon, David D. Ha, Peter M. Klauss, Christopher P. Curren, and Thomas H. James, filed on Jul. 21, 2000;

U.S. patent application Ser. No. 09/620,773, entitled "SUPER ENCRYPTED STORAGE AND RETRIEVAL OF MEDIA PROGRAMS WITH MODIFIED CONDITIONAL ACCESS FUNCTIONALITY," by Raynold M. Kahn, Gregory J. Gagnon, David D. Ha, Peter M. Klauss, Christopher P. Curren, and Thomas H. James, filed on Jul. 21, 2000;

U.S. patent application Ser. No. 09/620,832, entitled "VIDEO ON DEMAND PAY PER VIEW SERVICES WITH UNMODIFIED CONDITIONAL ACCESS FUNCTIONALITY" by Raynold M. Kahn, Gregory J. Gagnon, David D. Ha, Peter M. Klauss, Christopher P. Curren, and Thomas H. James, filed on Jul. 21, 2000; and U.S. patent application Ser. No. 09/491,959, entitled "VIRTUAL VIDEO ON DEMAND USING MULTIPLE ENCRYPTED VIDEO SEGMENTS," by Robert G. Arsenault and Leon J. Stanger, filed on Jan. 26, 2000.

This application is also related to the following applications:

Application Ser. No. 09/590,417, entitled "METHOD AND APPARATUS FOR TRANSMITTING, RECEIVING, AND UTILIZING AUDIO/VISUAL SIGNALS AND OTHER INFORMATION", filed Jun. 8, 2000, by Arthur Tilford:

Application Ser. No. 09/620,772, entitled "SUPER ENCRYPTED STORAGE AND RETRIEVAL OF MEDIA PROGRAMS WITH SMARTCARD GENERATED KEYS", filed Jul. 21, 2000, by Raynold M. Kahn et al., which application is hereby incorporated by reference herein;

Application Ser. No. 09/960,824 entitled "METHOD AND APPARATUS FOR ENCRYPTING MEDIA PROGRAMS FOR LATER PURCHASE AND VIEWING", filed Sep. 21, 2001, by Raynold M. Kahn et al.;

Application Ser. No. 10/490,261 entitled "METHOD AND APPARATUS FOR CONTROLLING PAIRED OPERATION OF A CONDITIONAL ACCESS MODULE AND AN INTEGRATED RECEIVER AND DECODER", filed Aug. 5, 2004, by Raynold M. Kahn et al., which is a national stage entry of PCT/US02/29881 filed Sep. 20, 2002;

Application Ser. No. 10/758,811 entitled "DISTRIBUTION OF VIDEO CONTENT USING A TRUSTED NETWORK KEY FOR SHARING CONTENT", filed Jan. 16, 2004, by Raynold M. Kahn et al;

Application Ser. No. 10/758,818 entitled "DISTRIBUTION OF BROADCAST CONTENT FOR REMOTE DECRYPTION AND VIEWING", filed Jan. 16, 2004, by Raynold M. Kahn et al;

Application Ser. No. 10/758,865 entitled "DISTRIBUTION OF VIDEO CONTENT USING CLIENT TO HOST PAIRING OF INTEGRATED RECEIVERS/DECODERS" filed Jan. 16, 2004, by Raynold M. Kahn et al;

Application Ser. No. 10/759,679 entitled "VIRTUAL VIDEO ON DEMAND USING MULTIPLE ENCRYPTED VIDEO SEGMENTS", filed Jan. 19, 2004, by Robert G. Arsenault et al., which is a continuation of application Ser. No. 09/491,959, entitled "VIRTUAL VIDEO ON DEMAND USING MULTIPLE ENCRYPTED VIDEO SEGMENTS", filed Jan. 26, 2000, by Robert G. Arsenault et al., now issued Mar. 2, 2004 as U.S. Pat. No. 6,701,528, which application is hereby incorporated by reference herein;

Application Ser. No. 10/790,466 entitled "VIDEO ON DEMAND IN A BROADCAST NETWORK", filed Mar. 1, 2004, by Stephen P. Dulac;

Application Ser. No. 11/433,926 entitled "METHODS AND APPARATUS TO PROTECT CONTENT IN HOME NETWORKS", filed May 15, 2006, by Raynold M. Kahn;

Application Ser. No. 11/433,969 entitled "METHODS AND APPARATUS TO PROVIDE CONTENT ON DEMAND IN CONTENT BROADCAST SYSTEMS", filed May 15, 2006, by Peter M. Klauss et al.;

Application Ser. No. 11/434,082 entitled "CONTENT DELIVERY SYSTEMS EMS AND METHODS TO OPERATE THE SAME", filed May 15, 2006, by Raynold M. Kahn et al.;

Application Ser. No. 11/434,404 entitled "SECURE CONTENT TRANSFER SYSTEMS AND METHODS TO OPERATE THE SAME", filed May 15, 2006, by Raynold M. Kahn et al;

Application Ser. No. 11/434,437 entitled "METHODS AND APPARATUS TO CONDITIONALLY AUTHORIZE CONTENT DELIVERY AT RECEIVERS IN PAY DELIVERY SYSTEMS", filed May 15, 2006, by Raynold M. Kahn et al.;

Application Ser. No. 11/434,528 entitled "METHODS AND APPARATAUS TO CONDITIONALLY AUTHORIZE CONTENT DELIVERY AT BROADCAST HEADENDS IN PAY DELIVERY SYSTEMS", filed May 15, 2006, by Raynold M. Kahn et al.;

Application Ser. No. 11/434,538 entitled "METHODS AND APPARATUS TO CONDITIONALLY AUTHORIZE CONTENT DELIVERY AT CONTENT SERVERS IN PAY DELIVERY SYSTEMS", filed May 15, 2006, by Raynold M. Kahn et al.;

Application Ser. No. 11/499,635 entitled "DISTRIBUTED MEDIA-PROTECTION SYSTEMS AND METHODS TO OPERATE THE SAME", filed Aug. 4, 2006, by Michael Ficco.

Application Ser. No. 11/499,636 entitled "DISTRIBUTED MEDIA-AGGREGATION SYSTEMS AND METHODS TO OPERATE THE SAME", filed Aug. 4, 2006, by Michael Ficco;

Application Ser. No. 11/501,985 entitled "SECURE DELIVERY OF PROGRAM CONTENT VIA A REMOVAL STORAGE MEDIUM", filed Aug. 10, 2006, by Raynold M. Kahn et al.;

Application Ser. No. 11/654,752 entitled "SECURE STORAGE AND REPLAY OF MEDIA PROGRAMS USING A HARD-PAIRED RECEIVER AND STORAGE DEVICE", filed Jan. 18, 2007, by Raynold M. Kahn et al., which is a continuation of application Ser. No. 09/620,833, entitled "SECURE STORAGE AND REPLAY OF MEDIA PROGRAMS USING A HARD-PAIRED RECEIVER AND STORAGE DEVICE", filed Jul. 21, 2000, by Raynold M. Kahn et al., which application is hereby incorporated by reference; and Application Ser. No. 11/701,800 entitled "SUPER ENCRYPTED STORAGE AND RETRIEVAL OF MEDIA PROGRAMS IN A HARD-PAIRED RECEIVER AND STORAGE DEVICE", filed Feb. 2, 2007, by Raynold M. Kahn et al., which is a continuation of application Ser. No. 09/621,476, entitled "SUPER ENCRYPTED STORAGE AND RETRIEVAL OF MEDIA PROGRAMS IN A HARD-PAIRED RECEIVER AND STORAGE DEVICE", filed Jul. 21, 2000, by Raynold M. Kahn et al., now issued Apr. 10, 2007 as U.S. Pat. No. 7,203,311.

BACKGROUND OF THE INVENTION

1. Field of the Invention

The present invention relates to systems and methods for providing video program material to subscribers, and in particular to a method and system for securely storing and replaying media programs.

2. Description of the Related Art

In recent years, there has been increasing interest in allowing cable and satellite television subscribers to record broadcast media programs for later viewing. This capability, hereinafter referred to as personal video recording (PVR), can be used to provide video-on-demand (VOD) services, or simply to allow the subscriber to save media programs for repeated viewing and/or archival purposes.

In the past, video cassette tape recorders (VCRs) have been used for such personal video recording. Recently, however, hard disks, similar to those used in personal computers, have been used to store media programs for later viewing. Unlike VCRs, such devices typically do not include a tuner, and are instead coupled to the satellite receiver or cable box. Also unlike VCRs, these devices are typically used to record digital content, not analog video. This difference is both advantageous and disadvantageous.

An advantage of such devices is that they permit long term storage and multiple replays without substantial degradation. Another advantage is that they permit more rapid trick-play functions such as fast forwarding and rewinding. A disadvantage of such devices is that they are capable of making multiple-generation copies of the program material as well, and without serious degradation. This raises the very real possibility that the multiple generation copies of the media programs will be produced and distributed without permission. This possibility has caused some media providers to be reluctant to allow their media programs to be recorded by such devices.

To ameliorate this problem, it is critical to protect the stored media programs with strong security and copy control. Current devices do not scramble media programs before storage, nor do they store copy protection information. Instead, such devices record decrypted program content into the storage disk using a paired hardware scheme in which the hard disk controller and hard disk are paired to each other specifically through a specific interface. Because the hard disk controller and the disk itself are essentially paired together, storage or playback will not function if the disk were to be removed and transferred to another player. The weakness of this security scheme is that it relies only on the paired hardware to ensure security . . . the media programs stored on the disk drive itself are not encrypted.

While it would presumably be possible to simply store the datastream as it is received from the broadcaster for later replay, this technique has distinct disadvantages. One such disadvantage is that it would provide pirates a permanently recorded version of the encrypted datastream, thus providing the pirate with information that can be used to perform detailed analyses of the datastream itself to determine the encryption techniques and codes.

What is needed is a system and method for securely recording broadcast media programs (including impulse purchase pay-per-view programs) for limited use playback at a later time. Such a system could be used to support video-on-demand (VOD), thus allowing the subscriber to purchase media programs and games from the set top box instantly without worrying about the start time of the program. What is also needed is a system and method that does not require substantial changes to subscriber hardware, such as the integrated receiver/decoder (IRD), or the conditional access module (CAM) that is used to provide a key to decrypt the media programs for presentation to the subscribers.

SUMMARY OF THE INVENTION

In summary, the present invention describes a system and method for storing and retrieving program material for subsequent replay. The method comprises the steps of accepting encrypted access control information and the program material encrypted according to a first encryption key, the access control information including a first encryption key and control data; decrypting the received access control information to produce the first encryption key; decrypting the program material using the first encryption key; re-encrypting the program material according to a second encryption key; encrypting the second encryption key according to a third encryption key to produce a fourth encryption key; and providing the re-encrypted program material and a fourth encryption key for storage.

The apparatus comprises a conditional access module, for accepting encrypted access control information and the program material encrypted according to a first encryption key, the encrypted access control information including the first encryption key and temporally-variant control data, the control access module comprising a first decryption module, for decrypting the access control information to produce the first encryption key; a first encryption module for encrypting a second encryption key with a third encryption key to produce a fourth encryption key; and a second decryption module for decrypting the fourth encryption key to produce the second encryption key.

One object of the present invention is to provide for the reception and decryption of broadcast media programs, including impulse pay-per-view (IPPV) programs, that can be played and recorded onto storage media and allows playback at a later time with limited use. The data itself may be placed in short term storage, but the replay of the media programs can be accomplished with trick play functions such as forward, reverse, fast forward, fast reverse, frame advance, and pause functions.

Another object of the present invention is to provide PVR functions which provide recording, delayed playback, and trick play of IPPV media programs from the storage media without requiring a pre-purchase of the IPPV media program. This would allow the IPPV media program to be viewed without requiring the IPPV media program to be purchased prior to storage. Ideally, such a system would allow the user to select the IPPV media program from the storage device, subject to limited play rights.

Still another object of the present invention is to provide a pairing between the storage media and elements of the subscriber's IRD to assure that playback of the media programs from the storage device is permitted only with the proper IRD.

Still another object of the present invention is to provide a secure means for storing broadcast data streams (including IPPV and games) on a data storage device, while providing for adequate copy protection.

Still another object of the present invention is to provide a system and method for handling the archiving and retrieving of media programs and other data, even if the data storage device fails.

Still another object of the present invention is to provide a system and method that allows media program purchases to be recorded in a way that is analogous to that which is employed for real-time off-the-air programs.

Still another object of the present invention is to provide a system that provides a growth path to a system permitting IPPV media programs to be previewed without charge for an initial period of time with the option to purchase the media program or cancel the purchase, regardless of whether the program is retrieved from the storage device or obtained from a real time broadcast.

The present invention eliminates concerns regarding the proliferation of unauthorized digital copies of the media programs by use of a strong encryption method. Further, the present invention ensures that the stored material cannot be distributed since such decryption of the material can only be successfully performed by the encrypting IRD.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Video Distribution System

Figure 1:
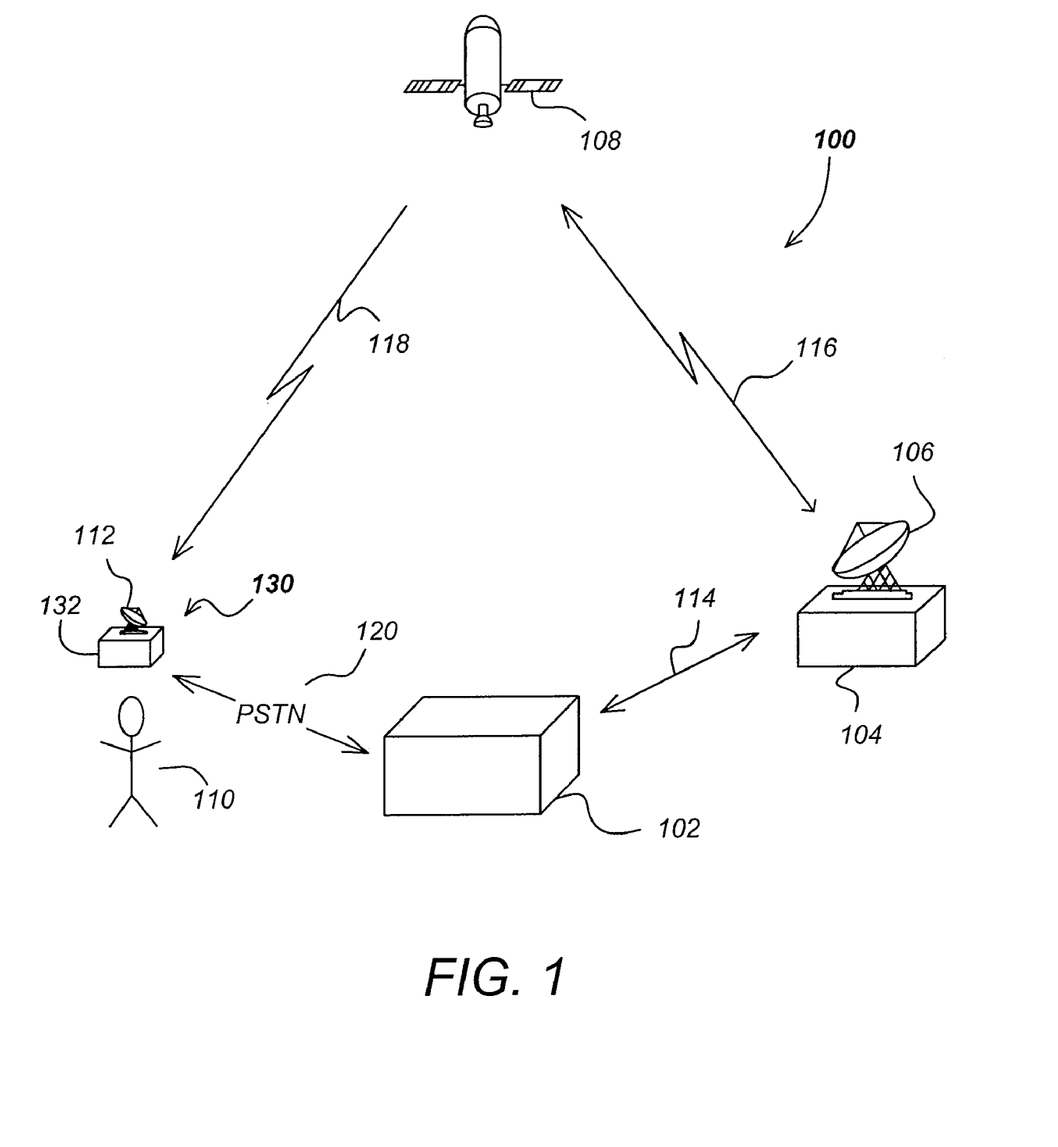
FIG. 1 is a diagram showing an overview of a video distribution system.

FIG. 1 is a diagram illustrating an overview of a video distribution system 100. The video distribution system 100 comprises a control center 102 in communication with an uplink center 104 via a ground link 114 and an integrated receiver/decoder (IRD) 132 at receiver station 130 via a public switched telephone network (PSTN) or other link 120. The control center 102 provides program material to the uplink center 104, coordinates with the receiver station 130 to offer subscribers 110 pay-per-view (PPV) program services, including billing and associated decryption of video programs.

The uplink center 104 receives program material and program control information from the control center 102, and using an uplink antenna 106, transmits the program material and program control information to the satellite 108. The satellite 108 receives and processes this information, and transmits the video programs and control information to the IRD 132 at the receiver station 130 via downlink 118. The IRD 132 receives this information using the subscriber antenna 112 to which it is communicatively coupled.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscribers 110. However, using data compression and multiplexing techniques the channel capabilities are far greater. For example, two-satellites 108 working together can receive and broadcast over 150 conventional (non-HDTV) audio and video channels via 32 transponders.

While the invention disclosed herein will be described with reference to a satellite based video distribution system 100, the present invention may also be practiced with terrestrial-based transmission of program information, whether by traditional broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber is video (and audio) program material such as a movie, the foregoing method can be used to deliver program material comprising purely audio information or data as well.

Figure 2:
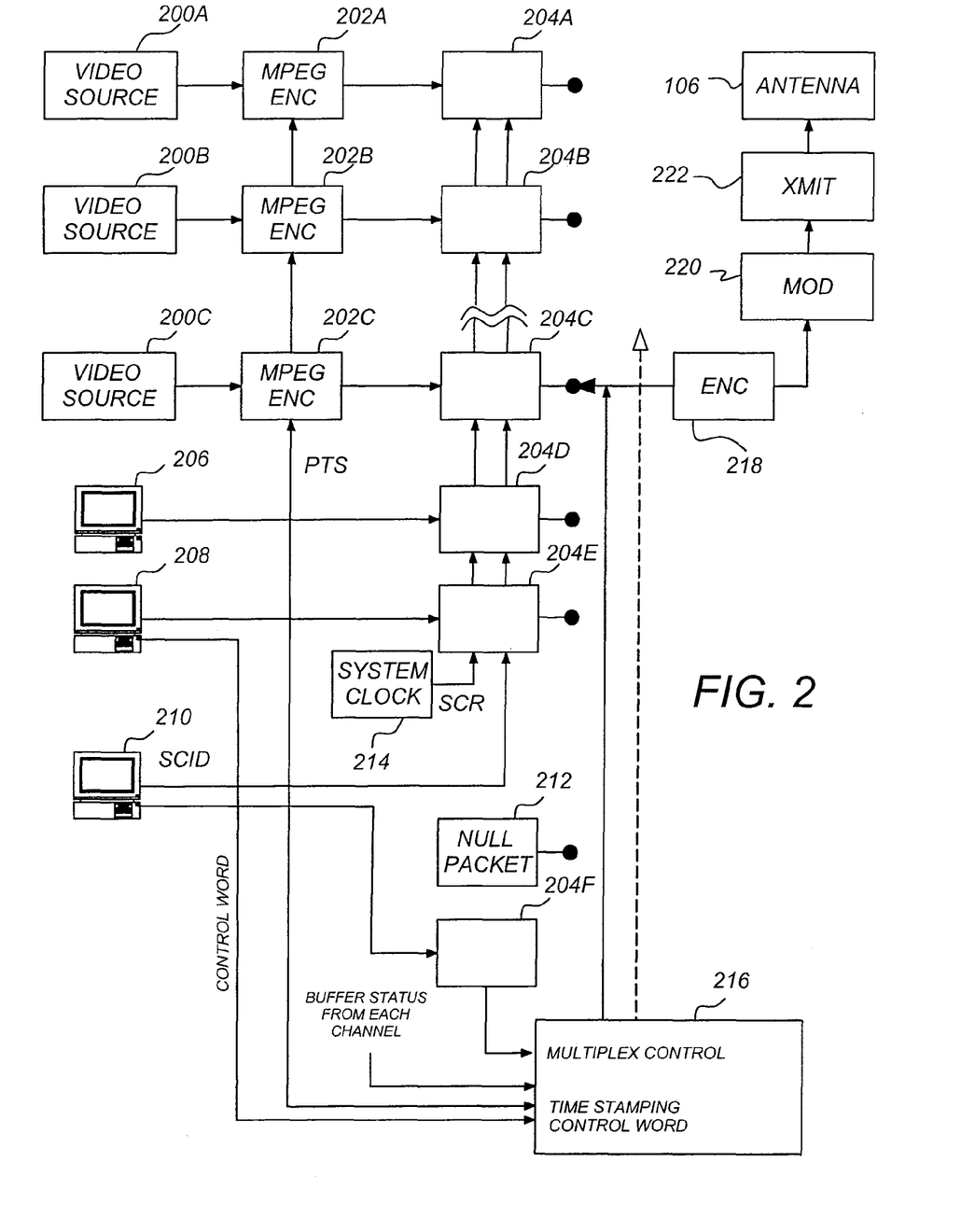
FIG. 2 is a block diagram showing a typical uplink configuration showing how video program material is uplinked to a satellite for transmission to subscribers using a single transponder.

FIG. 2 is a block diagram showing a typical uplink configuration for a single satellite 108 transponder, showing how video program material is uplinked to the satellite 108 by the control center 102 and the uplink center 104. FIG. 2 shows three video channels (which could be augmented respectively with one or more audio channels for high fidelity music, soundtrack information, or a secondary audio program for transmitting foreign languages), and a data channel from a computer data source 206.

The video channels are provided by a program source of video material 200A-200C (collectively referred to hereinafter as video source(s) 200). The data from each video program source 200 is provided to an encoder 202A-202C (collectively referred to hereinafter as encoder(s) 202). Each of the encoders accepts a presentation time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A-204F (collectively referred to hereinafter as packetizer(s) 204) associated with each source 200, 206-210.

The data packets are assembled using a reference from the system clock 214 (SCR), a control word (CW) generated by the conditional access manager 208, and a system channel identifier (SCID) generator 210 that associates each of the data packets that are broadcast to the subscriber with a program channel. This information is transmitted to the packetizers 204 for use in generating the data packets. These data packets are then multiplexed into serial data, encoded, modulated, and transmitted. A special packet known as a control word packet (CWP) which comprises control data including the control word (CW) and other control data used in support of providing conditional access to the program material is also encrypted and transmitted.

Figure 3A:
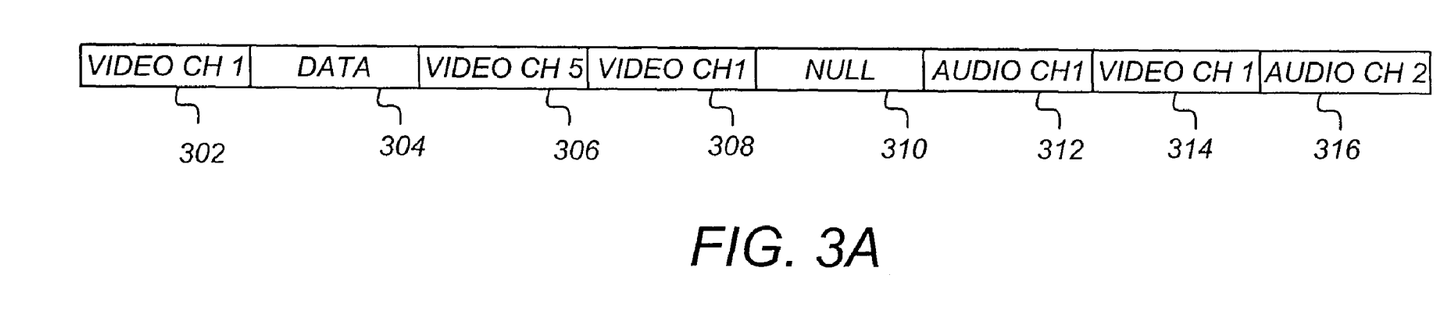
FIG. 3A is a diagram of a representative data stream received from a satellite.

FIG. 3A is a diagram of a representative data stream. The first packet segment 302 comprises information from video channel 1 (data coming from, for example, the first video program source 200A). The next packet segment 304 comprises computer data information that was obtained, for example from the computer data source 206. The next packet segment 306 comprises information from video channel 5 (from one of the video program sources 200), and the next packet segment includes information from video channel 1 (again, coming from the first video program source 200A). The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106.

Subscribers 110 receive media programs via a subscriber receiver or IRD 132. Using the SCID, the IRD 132 reassembles the packets to regenerate the program material for each of the channels. As shown in FIG. 3A, null packets created by the null packet module 312 may be inserted into the data stream as desired.

Figure 3B:
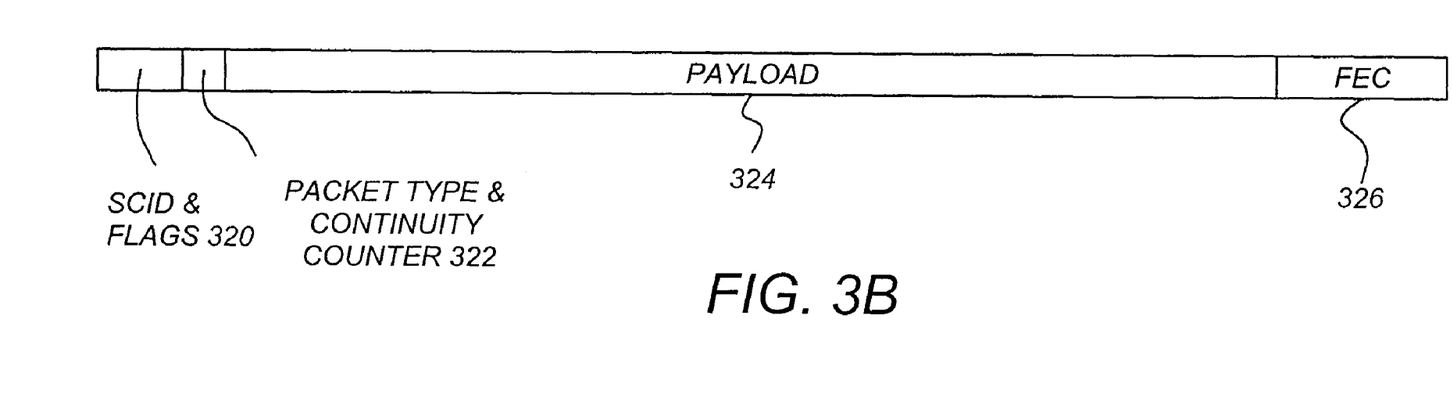
FIG. 3B is a diagram illustrating the structure of a data packet.

FIG. 3B is a diagram of a data packet. Each data packet (e.g. 302-316) is 147 bytes long, and comprises a number of packet segments. The first packet segment 320 comprises two bytes of information containing the SCID and flags. The SCID is a unique 12-bit number that uniquely identifies the data packet's data channel. The flags include 4 bits that are used to control whether the packet is encrypted, and what key must be used to decrypt the packet. The second packet segment 322 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 324 comprises 127 bytes of payload data, which is a portion of the video program provided by the video program source 200. The final packet segment 326 is data required to perform forward error correction.

Encryption of Media Programs

Media programs are encrypted by the encryption module 218 before transmission to assure that they are received and viewed only by authorized subscribers. Each media program is encrypted according to an alphanumeric encryption key referred to hereinafter as a control word (CW). This can be accomplished by a variety of data encryption techniques, including the data encryption standard (DES) and the Rivest-Shamir-Adleman (RSA) algorithm.

To decrypt the media programs, the subscriber's 110 IRD 132 must also have access to the CW. To maintain security, CWs are not transmitted to the IRD 132 plaintext. Instead, CWs are encrypted before transmission to the subscriber's IRD 132. The encrypted CW is transmitted to the subscriber's IRD 132 in a control word (data) packet.

In one embodiment, the data in the CWP, including the CW, is encrypted and decrypted via what is referred to hereinafter as an input/output (I/O) indecipherable algorithm.

An I/O indecipherable algorithm is an algorithm that is applied to an input data stream to produce an output data stream. Although the input data stream uniquely determines the output data stream, the algorithm selected is such that it's characteristics cannot be deciphered from a comparison of even a large number of input and output data streams. The security of this algorithm can be further increased by adding additional functional elements which are non-stationary (that is, they change as a function of time). When such an algorithm is provided with identical input streams, the output stream provided at a given point in time may be different than the output stream provided at another time.

So long as the encryption module 218 and the IRD 132 share the same I/O indecipherable algorithm, the IRD 132 can decode the information in the CWP to retrieve the CW. Then, using the CW, the IRD 132 can decrypt the media program so that it can be presented to the subscriber 110.

To further discourage piracy, the control data needed to decrypt and assemble data packets into viewable media programs may be time-varying (the validity of the control data in a CWP to decode a particular media program changes with time). This can be implemented in a variety of ways.

For example, since each CWP is associated with a SCID for each media program, the SCID related to each CWP could change over time.

Another way to implement time-varying control data is to associate time stamps with the received data stream and the CWP control data. In this case, successful decoding of the CWP to produce the CW would require the proper relationship between the time stamps for the data stream and the control data in the CWP. This relationship can be defined, for example, by changing the decryption scheme used to generate the CW from the CWP according to the received time stamp for the data stream. In this case, if the time stamp of the received data stream does not match the expected value, the wrong decryption scheme will be selected and the proper CW (to decrypt the program material) will not be produced. If, however, the time stamp of the received data stream matches the expected value, the proper decryption scheme will be selected, and the CWP decryption scheme will yield the proper CW.

Requesting Pay-Per-View Services

The data required to receive pay-per-view (PPV) media programs are stored in the CWP and in another data packet known as the purchase information parcel (PIP). Both the CWP and the PIP are broadcast to the subscriber via the video distribution system 100 in real time. As described below, the CWP is used by the IRD 132 to retrieve PPV media programs.

Figure 4:
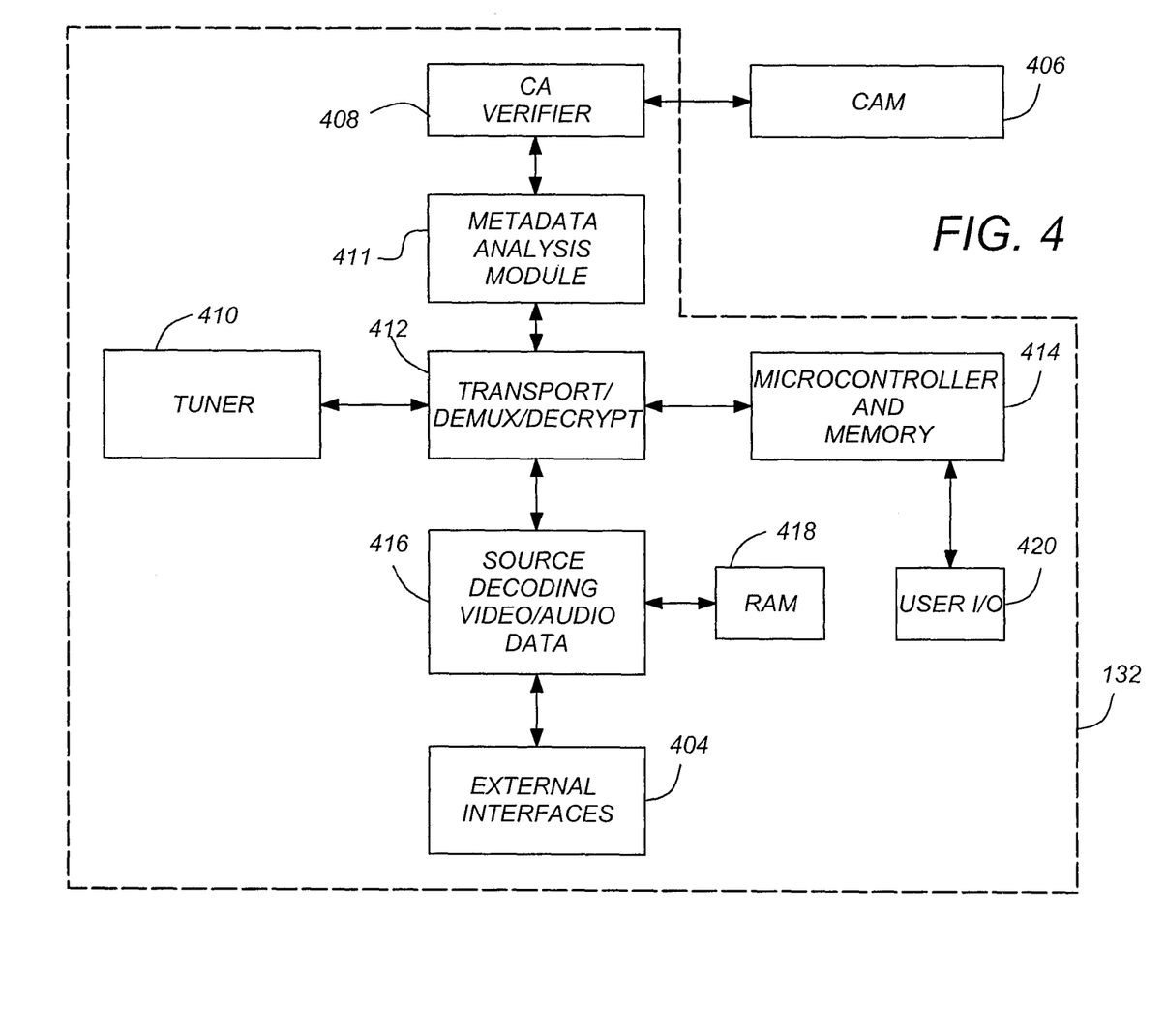
FIG. 4 is a block diagram illustrating a high-level block diagram of the IRD.

Generally, PPV services can include operator-assisted pay-per-view (OPPV) and impulse pay-per-view (IPPV) services. When requesting OPPV services, the subscriber 110 must decide in advance that they desire access to a particular media program. The subscriber 110 then calls an entity such as the control center 102, and requests access to the media program. When requesting impulse pay-per-view services (IPPV), the subscriber 110, while viewing the program guide, moves the cursor over the viewer channel associated with the desired media program, and selects "enter." After the decision and rights to purchase a PPV program are confirmed (for example, by checking channel lockouts, rating limits, and purchase limits), a purchase information parcel (PIP) is received and stored in the subscriber's conditional access module 406 (which is described in more detail below) for further use. The conditional access module 406 associates the information in the CWP and the PIP, and uses the PIP in conjunction with the CWP to verify that the subscriber 110 should be provided access to the media program and to decrypt the media program.

Ordering PPV media programs in advance using the PIP is limited, however, since the PIP is broadcast up to 24 hours before the media program itself is broadcast. Since the PIP is broadcast in real time, the IRD 132 does not acquire the PIP until the subscriber 110 actually requests the PPV media program purchase.

Subscriber Reception and Decryption of Media Programs

FIG. 4 is a simplified block diagram of an IRD 132. The IRD 132 receives and decrypts the media programs broadcast by the video distribution system 100. These media programs are streamed to the IRD 132 in real time, and may include, for example, video, audio, or data services.

The IRD 132 is communicatively coupleable to a conditional access module (CAM) 406. The CAM 406 is typically implemented in a smart card or similar device, which is provided to the subscriber 110 to be inserted into the IRD 132. The CAM 406 interfaces with a conditional access verifier (CAV) 408 which performs at least some of the functions necessary to verify that the subscriber 110 is entitled to access the media programs. The CAV 408 is communicatively coupled to a metadata analysis module (MAM) 411. Using the information in metadata table (e.g. Table 1 described below), the MAM 411 acts as a gate-keeper to determine whether stored media programs will be decrypted and presented to the subscriber 110. This is accomplished by comparing the metadata values with measured or accumulated values. The CAV 408 and the MAM 411 can be implemented as separate modules from the transport/demux/decryptor 412 and the microcontroller and memory 414 as shown, or may be implemented via software instructions stored in the memory and performed by the microcontroller 414.

The IRD 132 comprises a tuner 410, a transport and demultiplexing module (TDM) 412, which operates under control of a microcontroller and associated memory 414, a source decoder 416 and communicatively coupled random access memory (RAM) 418, and a user I/O device for accepting subscriber 110 commands and for providing output information to the subscriber.

The tuner receives the data packets from the video distribution system and provides the packets to the TDM 412. Using the SCIDs associated with each media program, the TDM 412 reassembles the data packets according to the channel selected by the subscriber 110, and unencrypts the media programs using the CW key. The TDM 412 can be implemented by a single secure chip, and is communicatively coupled to a microcontroller and memory 414.

Once the media programs are unencrypted, they are provided to the source decoder 416 which decodes the media program data according to MPEG or JPEG standards as appropriate. The decoded media program is then provided to a D/A converter (if necessary) and provided to external interfaces 404 which can include a media program presentation device such as a television, an audio system, or a computer. The source decoder 416 makes use of communicatively coupled RAM 418 to perform these functions.

The CW key is obtained from the CWP using the CAV 408 and the CAM 406. The TDM 412 provides the CWP to the CAM 406 via the CAV 408. The CAM 406 uses the I/O indecipherable algorithm to generate the CW, which is provided back to the TDM 412. The TDM 412 uses the CW to decrypt the media programs. In most IRDs 132, the CAV 408 and the CAM 406 are capable of decrypting one video/audio/data media program at a time.

As described above, to discourage potential pirates, the control data in the CWP used to decode a particular media program may change with time so that it only produces the proper CW when applied to a media program having the proper time stamp. In this case, the CAM 406 can select and/or control the decryption scheme (e.g. the I/O indecipherable algorithm) according to the time stamp associated with the data stream carrying the media program. If the media program is sufficiently disassociated in time, the improper decryption scheme will be used, and the proper CW to decode the media program will not be produced.

Further details regarding the encryption and decryption of media programs can be found in co-pending and commonly assigned U.S. patent application Ser. No. 09/491,959.

Storage and Retrieval of Media Programs in Encrypted Form

Figure 5:
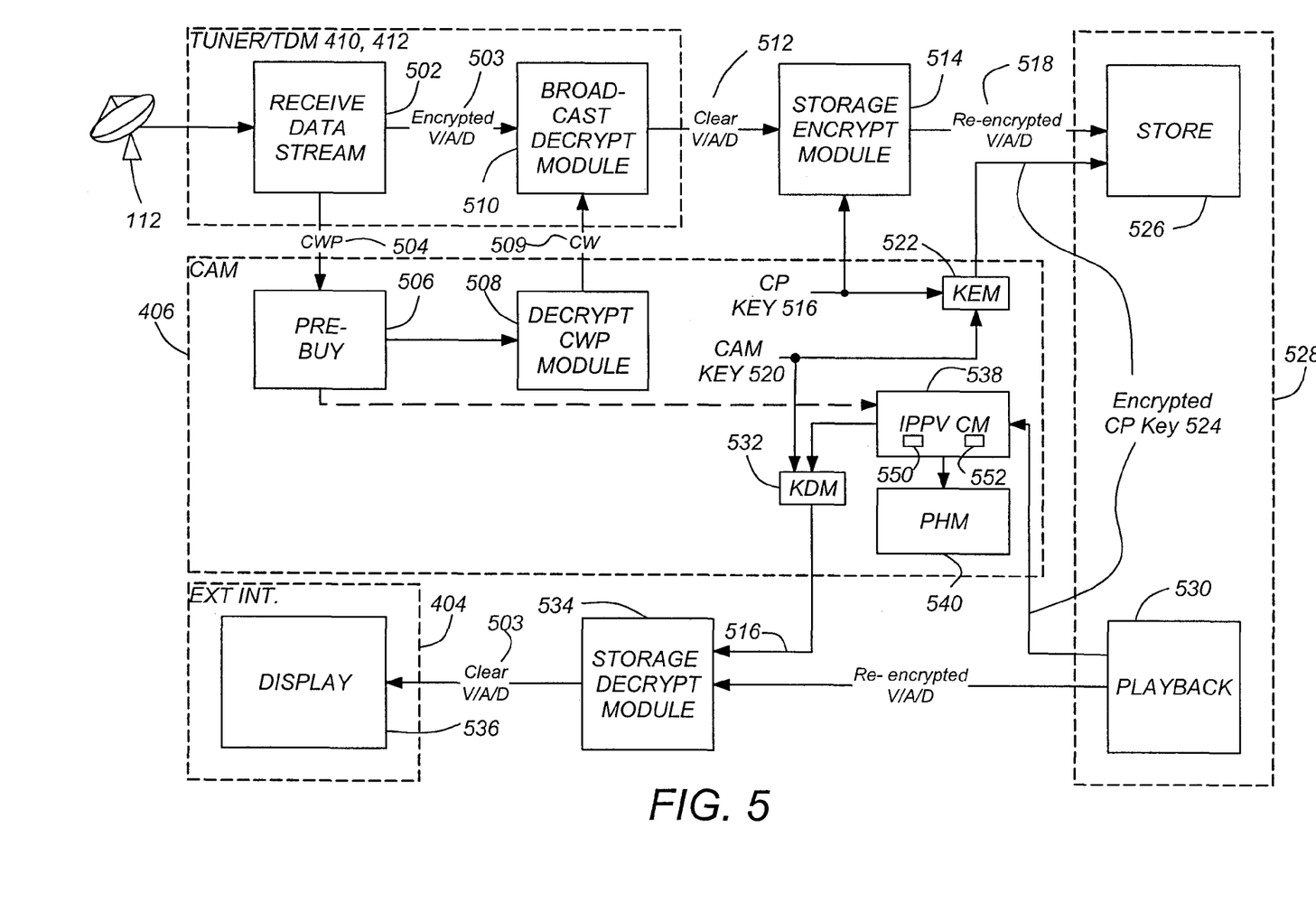
FIG. 5 is a diagram illustrating the storage and retrieval of data from a media storage device.

FIG. 5 is a diagram presenting exemplary method steps used to practice one embodiment of the present invention. A data stream is provided by the subscriber antenna 112 and received by the tuner 410 and the TDM 412, as shown in block 502. The data stream includes a plurality of data packets including data packets with the program material 503 encrypted according to a first encryption key (CW key 509), and access control information which is contained within one or more control word packets (CWP) 504. The CWPs 504 include an encrypted version of the CW key 509. The data stream may also include metadata describing information including rights associated with the program material (which may include, for example, replay rights and/or copy rights). These rights include parameters necessary for controlling the replay of program material, including IPPV or pay-per-play services.

The encrypted program material 503 (denoted Encrypted V/A/D in FIG. 5 to indicate that the program material can include video, audio, or other data) is provided to a broadcast decryption module 510. The broadcast decryption module 510 decrypts the encrypted program material according to the CW key 509.

The CWPs 504 are provided to a pre-buy module 506 in the CAM 406. The pre-buy module 506 accepts the metadata in the CWP 504 and generates replay and/or copy right data that is used when the subscriber 110 later decides to replay the program material. This replay right data is provided to a communicatively coupled IPPV control module 538 (IPPV CM), which uses this information as well as to purchase (or buy) information provided by the subscriber 110 to determine whether the stored program material should be played back. The IPPV CM module 538 is also communicatively coupled to a purchase history module 540 (PHM), which collects information required to bill the subscriber 110 for program material that is viewed by the subscriber 110.

The IPPV CM 538 also provides information used to determines whether the program material received by the tuner/TDM 410, 412 is recorded in the media storage device 528. In one embodiment, this information can be obtained from the data stream broadcast by the provider of the program material.

If the program material is to be stored in the media program device 528, the CWP 504 (which at this point includes temporally-variant control data) is then provided to and decrypted by a CWP decryptor module 508. In one embodiment of the present invention, the CWP 506 is encrypted according to an I/O indecipherable algorithm, and the CWP decryptor module 508 includes the application of the I/O indecipherable algorithm. In another embodiment of the present invention, the CWP 504 is encrypted with a key and a DES or RSA algorithm, and the CWP decryptor module 508 involves the application of the key to reconstruct the encrypted data within the CWP 504. The CWP decrypt module 508 can be invoked for all data streams received by the IRD 132, or can be invoked only for data streams associated with media programs that have been selected for recording by the subscriber 110. The pre-buy module 506 accepts data from the user I/O 420 or from the broadcaster indicating that the subscriber 110 would like to purchase and record a particular media program. If such a purchase (advance or pre-buy) has been requested, the CWP decrypt operations depicted in block 508 commence when the media program is broadcast. In another embodiment of the present invention, the broadcaster determines which programs with be stored on the media storage device 528, and the subscriber 110 need not decide in advance which media programs should be stored for later viewing. For example, the broadcaster may store the ten most popular movies in the media storage device 528, and only bill the subscriber 110 when the subscriber opts to view the media program. In this case, the pre-buy module 506 receives the command to store the media program from the broadcaster and initiates the operations performed by the CWP decrypt module 508.

The CW 509 is provided to the broadcast decrypt module 510, which accepts the encrypted program material 503 to produce the decrypted program material 512. The decrypted program material 512 is provided from the broadcast decryption module 510 to a communicatively coupled copy protection (CP) storage encryption module 514. The storage encryption module 514 re-encrypts the decrypted program material 512 according to a copy protection (CP) key 516 to produce re-encrypted program material 518. Although the CP key 516 can be generated elsewhere, in the preferred embodiment, the CP key 516 is generated within the CAM 406.

In one embodiment, the CP key 516 is derived using a CP generation module in the CAM 406 or elsewhere in the IRD 132 from the metadata in the data stream that is broadcast to the tuner 410. Depending on the metadata, the CP key 516 may also be time variant with the broadcast program material. In another embodiment, the CP key 516 may be augmented with at least a portion of the metadata before being encrypted with the box key 516 and stored in the media storage device 528 as the encrypted CP key 524 (which itself is a "key"). In this embodiment, when the encrypted CP key 524 is decrypted, the CP key 516 and related metadata are both produced. The metadata can then be used to verify and/or control replay of the program material. The CP key 516 may also be internally generated by the IRD 132 without the metadata.

The CP key 516 is also provided to a key encryption module 522 (KEM) which encrypts the CP key 516 with a conditional access module (CAM) key 520, the value of which is typically unique to each CAM 406. The result of this process is an encrypted copy protection key 524. The re-encrypted program material 518 and the encrypted CP key 524 is then provided to the media storage device 528 for storage. The CAM key 520 could be an internal electronic serial number (ESN) of an integrated circuit implementing some or all of the functions of the CAM 406. The media storage device 528 is typically a hard drive, but may be device with sufficient capacity and access time to support recording and/or playback operations of the data stored therein.

When the subscriber 110 decides to play back the stored media programs, an appropriate user input is provided on the user I/O device 420. The user input may comprise a play command, a fast forward command, a reverse command, a fast play or fast reverse play command, or a pause command. In response to the user input, the IPPV CM 538 determines whether the program material in the media storage device 528 should be presented to the subscriber 110. In one embodiment, the user input comprises buy data, which identifies the subscriber 110, and the requested program material. This buy data is accepted by a purchase module 550, and compared to the program material rights data obtained from the metadata to determine whether the requested program material should be provided to the subscriber 110. If a determination is made that the program material should be provided, information is transmitted to the purchase history module 540. The purchase history module 540 stores information required to bill the subscriber the appropriate amount for the use of the program material. Further, if a determination is made that the program material should be provided, a control module 552 directs the re-encrypted program material 518 and the encrypted CP encryption key 524 to be retrieved from the media storage device 528. The control module 552 may also control when the key decryption module 532 decrypts the CP encryption key 524 to produce the CP key 516.

The CP encryption key 524 is decrypted using the CAM key 520 to produce the CP key 516. This CP key 516 and the re-encrypted program material 518 is provided to the storage decrypt module 534. The storage decrypt module 534 decrypts the further encrypted media program material 518 to produce the program material 503.

After suitable processing (i.e. MPEG and or JPEG decoding, decompression, conversion to an analog signal, etc.), the media program is provided to an external interface 404 device, which may include a presentation device such as a display 536.

One advantage of the present invention is that the data processing required to provide pay-per-play services is resident on the CAM 406. Hence, once the user initiates the purchase of the program material or requests trick play functions, the required processing utilized data replayed from the media storage device 528 and not from live streamed data. Since shuttling back and forth between real time viewing and live streamed data is minimized or eliminated, difficulties with the synchronization of data retrieved from the media storage device 528 are minimized.

In one embodiment of the present invention, the data stream received in IRD 132 further comprises metadata including data to control replay rights and copy protection. This metadata can be encrypted and stored in the media storage device 528 for later decryption and use when a request to view the media program is received. Alternatively, the metadata can be encrypted and broadcast in the data stream in real time for all PPV-enabled media programs, thus obviating the need for storing the information in the media storage device 528.

As described above, the relationship between the CWP 504 and the encrypted media program may be time-varying. The foregoing embodiment of the present invention, the expiration time associated with the SCIDs for the program material from the CWP 506 may be simply ignored.

Although the foregoing has been described with respect to a plurality of encryption modules (e.g. modules 514 and 522) and decryption modules (e.g. modules 508, 510, 532, and 534), the foregoing can be implemented with single encryption module, a single decryption module, or one or more single encryption/decryption module(s). In one embodiment of the present invention, the operations performed by modules 508, 522, and 532, are performed in a single integrated circuit device in, for example, the CAM 406.

CONCLUSION

The present invention describes a system and method for recording program material for subsequent replay in which encrypted video/audio/data streams with the program material are decrypted prior to disk storage. The CW key 509 is decoded from the CWP 504 via the CAM 406. This requires new CAM 406 functions to be created to permit pre-buying the IPPV program ahead of time and to store this pre-buy information on the CAM 406 or the disk drive. These new CAM 406 functions can be used to correlate different replay right of a broadcast service to control the amount of the time the broadcast service can be replayed. The new CAM 406 functions also include new replay right data packets that do not have an expiration time relationship with the SCIDs associated with the program material. The play right or replay right for the stored program materials are created so that actual play time and program expiration do not restrict the playback service from the disk drive. This embodiment does not require that the CWP 504 be stored on the disk drive.

In addition to processing the replay right metadata, the CAM 406 handles the generation, encryption, and decryption of the CP key 516 and the CAM key 520. A version of the CP key 516 encrypted by the CAM key 520 is stored on the disk drive. During playback, the replay metadata is retrieved from the disk (in the form of the encrypted CP key 516) and forwarded to the CAM 406. Alternatively, the replay metadata can be stored and retrieved in the CAM 406 instead of (or in addition to) the hard drive. The CP key 516 is also retrieved from the disk and used to decrypt the re-encrypted program material 518. In one embodiment, the CAM 406 also includes a module to install and restore CP keys 516 and CAM keys 520. Preferably, the CP key 516 and CAM key 520 are generated, stored, and maintained in a tamper-proof device. Even though the CWP 504 is not typically stored in the media storage device 528, new metadata is correlating replay and copy rights to the broadcast stream is stored on the media storage device 528.

During playback, the CAM 406 generates the CP key 516 used to decrypt the data stored on the media storage device 528. With the properties of the encrypted CP key 524 and additional CAM 406 functionality, the CAM 406 decrypts the encrypted CP key 524 using the CAM key 520.

In the present invention, the encryption, decryption, and CP key generation Functions are performed outside of the CAM 406. Instead of a unique CAM key 520 stored inside the CAM 406 itself, a unique IRD or box key stored in the IRD 132 could be used. To further enhance security, all of these key generating and encryption/decryption functions could be integrated into the transport chip of the IRD 132. This renders the examination of the functionality of the encrypt/decrypted and key generation features very difficult to accomplish. This helps to ensure the integrity of the system, minimizes the number of the changes to the current CAM 406 architecture, and allows the system to be less reliant on the CAM 406.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus for storing program material for replay, comprising:
   a receiver for accepting a data stream including data packets with program material encrypted according to a first encryption key and access control information which is contained within one or more control word packets that include an encrypted version of the first encryption key in the receiver;
   at least one processor, comprising:
   means for decrypting the received access control information in a conditional access module which is releaseably communicatively coupled to the receiver to produce the first encryption key;
   means for decrypting the program material using the first encryption key;
   means for re-encrypting the program material according to a second encryption key;
   means for encrypting the second encryption key according to a third encryption key to produce a fourth encryption key; and
   means for providing the re-encrypted program material and a fourth encryption key for storage.

2. The apparatus of claim 1, wherein the encrypted access control information is encrypted and further comprises temporally-variant control data, and the at least one processor further comprises:
   means for decrypting the received access control information to produce the temporally-variant control data; and
   means for modifying the temporally variant control data to generate temporally-invariant control data.

3. The apparatus of claim 1, wherein the conditional access module is implemented on a smartcard.

4. The apparatus of claim 1, wherein the access control information further comprises metadata describing at least one right for the program material.

5. The apparatus of claim 4, wherein the at least one processor further comprises:
   means for generating the second encryption key at least in part from the metadata.

6. The apparatus of claim 4, wherein the at least one processor further comprises:
   means for generating replay right data from the metadata.

7. The apparatus of claim 6, wherein the means for generating the replay right data further generates replay right data from pre-buy data.

8. The apparatus of claim 1, wherein the at least one processor further comprises:
- means for retrieving the stored re-encrypted program material and the fourth encryption key;
- means for decrypting the fourth encryption key using the third encryption key to produce the second encryption key; and
- means for decrypting the re-encrypted material using the second encryption key.

9. The apparatus of claim 8, wherein the means for decrypting the fourth encryption key using the third encryption key to produce the second encryption key is performed in response to a subscriber request to access the program material.

10. The apparatus of claim 9, wherein the access control information further comprises metadata describing at least one right for the program material, the subscriber request to access the program material comprises buy data, and the at least one processor further comprises:
- means for generating replay right data from the metadata;
- means for accepting the buy data;
- means for comparing the buy data with the replay right data; and
- means for decrypting the fourth encryption key using the third encryption key to produce the second encryption key according to the comparison between the buy data and the replay right data.

11. The apparatus of claim 10, wherein:
- the second encryption key and the third encryption key are stored in a smartcard, and the replay right data is generated from the metadata and the pre-buy message in the smartcard; and
- the means for accepting the buy data, means for comparing the buy data with the replay right data, and means for decrypting the fourth encryption key using the third encryption key to produce the second encryption key according to the comparison between the buy data and the replay right data is implemented in the smartcard.

12. The apparatus of claim 1, wherein the re-encrypted program material and the fourth encryption key are stored on a media storage device.

13. The apparatus of claim 1, wherein the control data is temporally-variant.

14. The apparatus of claim 13, wherein the temporally-variant control data associates an expiration time with the program material.

15. The apparatus of claim 1, wherein the second encryption key is stored in the conditional access module.

16. The apparatus of claim 1, wherein the at least one processor comprises a microcontroller having a memory having software instructions stored therein.

* * * * *